(12) United States Patent
Stansloski et al.

(10) Patent No.: US 9,841,329 B2
(45) Date of Patent: Dec. 12, 2017

(54) STRAIN GAGE BASED SYSTEM AND METHOD FOR FAILURE DETECTION OF A FLUID FILM BEARING

(71) Applicants: Mitchell Stansloski, Fort Collins, CO (US); Austin Neumeier, Fort Collins, CO (US); Grant Slinger, Fort Collins, CO (US)

(72) Inventors: Mitchell Stansloski, Fort Collins, CO (US); Austin Neumeier, Fort Collins, CO (US); Grant Slinger, Fort Collins, CO (US)

(73) Assignee: Pioner Engineering Company, Fort Collins, CO (US)

( * ) Notice: Subject to any disclaimer, the term of this patent is extended or adjusted under 35 U.S.C. 154(b) by 226 days.

(21) Appl. No.: 14/545,708

(22) Filed: Jun. 8, 2015

(65) Prior Publication Data
US 2016/0356657 A1    Dec. 8, 2016

(51) Int. Cl.
| | |
|---|---|
| G01B 7/16 | (2006.01) |
| G01L 1/00 | (2006.01) |
| G01L 1/18 | (2006.01) |
| G01L 1/16 | (2006.01) |
| G01M 13/04 | (2006.01) |
| G01L 5/16 | (2006.01) |

(52) U.S. Cl.
CPC .......... *G01L 1/18* (2013.01); *G01L 1/16* (2013.01); *G01L 5/161* (2013.01); *G01M 13/04* (2013.01)

(58) Field of Classification Search
USPC .......... 73/760, 769, 776–779, 781
See application file for complete search history.

(56) References Cited

U.S. PATENT DOCUMENTS

| | | | |
|---|---|---|---|
| 3,900,812 A | 8/1975 | Brewer | |
| 4,027,539 A | 6/1977 | Halloran | |
| 4,203,319 A | 5/1980 | Lechler | |
| 4,406,169 A | 9/1983 | Ikeuchi et al. | |
| 4,773,263 A * | 9/1988 | Lesage | E21B 12/02 |
| | | | 175/39 |
| 4,958,125 A * | 9/1990 | Jardine | E21B 12/02 |
| | | | 175/40 |
| 5,660,481 A | 8/1997 | Ide | |
| 6,508,128 B2 | 1/2003 | Bode | |
| 6,526,830 B2 | 3/2003 | Scholl et al. | |
| 6,766,697 B1 * | 7/2004 | Perez | F16C 17/03 |
| | | | 73/760 |
| 6,817,425 B2 * | 11/2004 | Schultz | E21B 12/02 |
| | | | 175/39 |

(Continued)

*Primary Examiner* — Clayton E Laballe
*Assistant Examiner* — Warren K Fenwick (57) ABSTRACT

A system and method for detecting a failure of a fluid film bearing is disclosed. The system and method use one or more non-laser based strain transducers to detect changes in the frequency spectrum of the pressure of the fluid film at one or more locations in the bearing to identify failure or the risk of failure of the bearing. The system and can use metallic film, piezoelectric, and piezoresistive strain sensors to generate alarms when particular frequency bands become present in the strain frequency spectrum. The system and method can also generate strain orbit plots and perform waveform analysis of the time varying strains in the bearing housing caused by time-varying changes in the pressure of the fluid film.

20 Claims, 8 Drawing Sheets

(56) References Cited

U.S. PATENT DOCUMENTS 7,345,844 B2 * 3/2008 Toffle .................... G11B 33/14
                                                                                  360/97.22
7,650,254 B2    1/2010 Pecher et al.

* cited by examiner

STRAIN GAGE BASED SYSTEM AND METHOD FOR FAILURE DETECTION OF A FLUID FILM BEARING

BACKGROUND

The present invention relates to fluid film bearings, which are also called journal bearings, hydrodynamic bearings, and babbitt bearings. More specifically, the present invention relates to systems and methods for detecting failures in fluid film bearings.

Fluid film bearings are used widely. These bearings theoretically have infinite life due to their inherent lubrication. However, error during operation and maintenance can cause fluid film bearings to fail. As an example of a failure mode for a fluid film bearing, consider a main engine bearing that is provided contaminated oil containing wear particles from somewhere else in the engine. These wear particles can score the surface of the bearing, causing increased friction and distortion of the bearing geometry. The added friction can increase the oil temperature, which typically reduces oil viscosity. The deformed geometry and altered viscosity can compromise the hydrodynamic wedge, leading to a change in the pressure distribution of the fluid film bearing. Increased oil temperature can also increase the temperature of the babbitt material. The increased temperature and pressure can cause the babbitt to displace or wipe, further compromising geometry of the fluid film bearing. Eventually there is a chance that the babbitt will become so distorted that it disrupts the formation of any fluid wedge, and the shaft will crash within the fluid film bearing.

Fluid film bearing failures can be difficult to predict, especially when compared to rolling element bearings. Furthermore, successful condition monitoring of fluid film bearings can pose a much greater challenge than for rolling element bearings. Rolling element bearings typically have low internal damping, and solid paths of transmission, which allows:

(a) vibrations to reach the bearing casing linearly;
(b) accelerometers to measure the vibrations of the bearing casing; and
(c) identification of any fault signatures in the resulting accelerometer signal or signals.

For fluid film bearings, a fluid such as oil or air separates the shaft from the bearing surfaces during normal operation. This fluid film can have much higher damping properties than for rolling element bearings, which can make the system higher order, and non-linear. Therefore, accelerometers external to the shaft can be unreliable for monitoring fluid film bearing faults because vibration of the case does not necessarily correlate to shaft vibration in a fluid film bearing. It is therefore desirable not to rely exclusively on accelerometers for fluid film bearing condition monitoring. Other technologies such as temperature trending, proximity sensing using eddy current probes, and/or the use of lasers can also be unfeasible or overly complex or costly for some fluid film bearing applications, and it is desirable not to rely exclusively on these technologies for fluid film bearing condition monitoring.

It is desired to have a more accurate, simpler, and/or lower cost system and method for monitoring fluid film dynamics and the condition of a fluid film bearing in order to improve the prognostics of devices that utilize fluid film bearings.

BRIEF DESCRIPTION OF THE DRAWINGS

The present disclosure is described in conjunction with the appended figures in which.

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes could be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, shapes and geometries may be shown generically and details may be left out in order not to obscure the embodiments in unnecessary detail.

In one embodiment, a system and method for failure detection of a fluid film bearing can comprise the measurement of strain to determine time-varying changes in the pressure of a the fluid film within the bearing. Strain could be measured using a strain transducer (or transducers)

located proximate to the fluid film, such as strain gages located in and/or on the babbitt or in and/or on another part of the bearing housing. Strain could be measured without using costly or expensive lasers. Time-varying signals from the strain transducers can be converted to show a relationship between frequency and amplitude. Frequencies can be analyzed to generate an alarm signal. The time-varying signals from the strain transducers can also be processed and analyzed to identify when pressures of the fluid film change, become elevated, and/or become concentrated within certain regions of the fluid film bearing.

Figure 1:
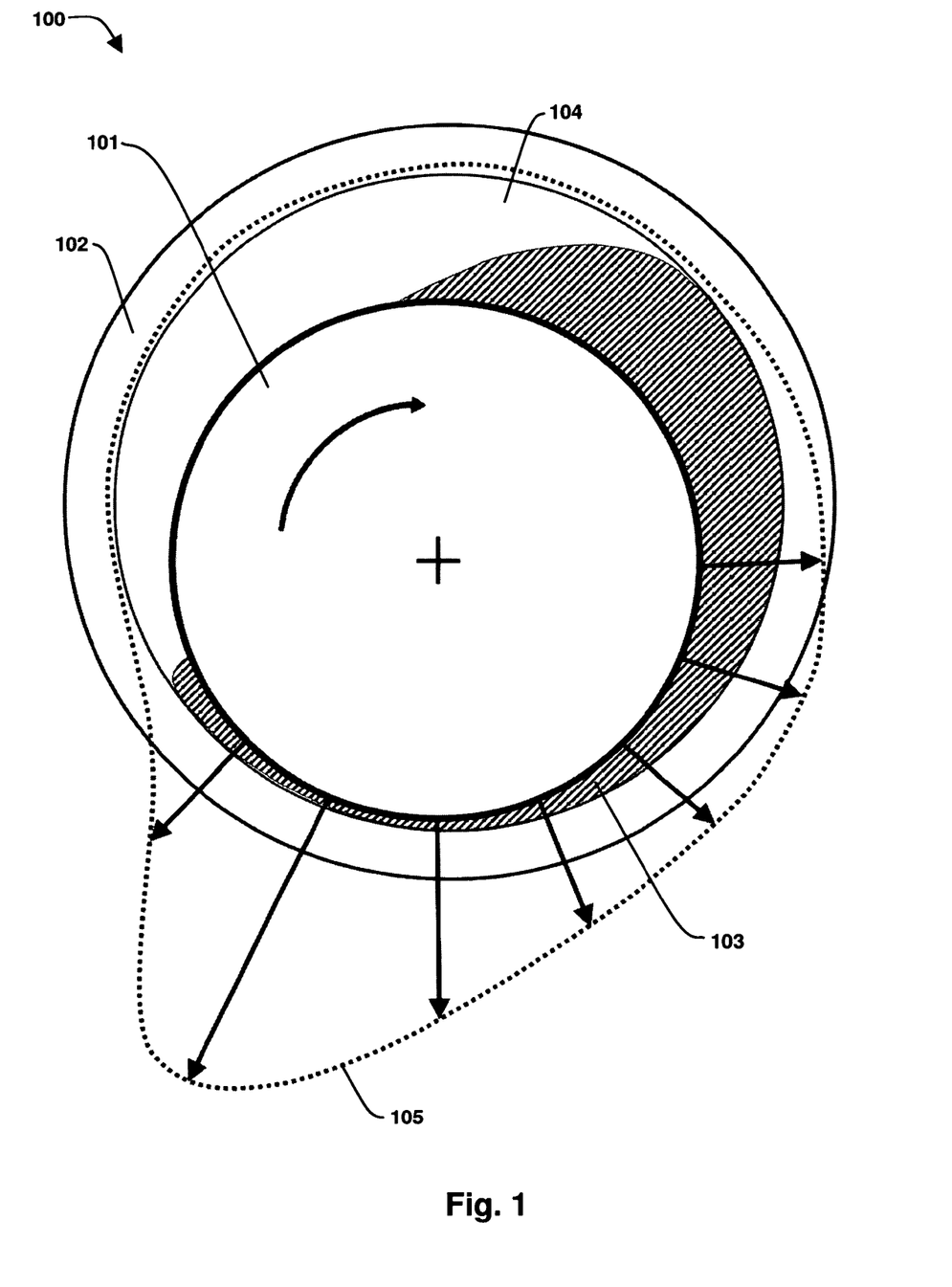
FIG. 1 shows an axial view of a shaft in a fluid film bearing to illustrate the distribution of forces in the fluid film bearing.

Fluid film bearing operation hinges on the formation of a high-pressure region in the fluid distribution. Typically, oil is used in industrial fluid film bearings, but other fluids, such as grease, water, or air could also be used. The fluid can be any liquid or gas having any density and viscosity capable of being understood by anyone skilled in the art. The turning shaft coupled with the fluid properties cause a distribution of pressures to form. FIG. 1 illustrates one example of this distribution and the forces present. The shaft will have a degree of eccentricity due to this distribution. This eccentricity controls the amount of stiffness and damping in the system. When bearing geometry, fluid properties, and operating loads are all perfect, the bearing will likely have infinite life. However aggravating conditions can compromise the operation of the fluid film bearing.

Referring to FIG. 1, a fluid film bearing is shown at 100. The fluid film bearing 100 comprises a rotating shaft 101, a bearing housing 102 and a fluid located in the space between the housing 102 and the shaft 101. The fluid, which can be a liquid (such as oil, grease, water, or drilling mud) or a gas (such as air), operates in two regions, a high pressure fluid region, shown at 103, and a low pressure fluid region, shown at 104. Fluid film bearings operation hinges on the formation of the high pressure region 103 in part of the fluid in the space between the bearing housing 102 and the rotating shaft 101. The distribution of pressure in the film bearing is depicted by a dotted line indicating the fluid pressure profile, shown at 105. This fluid pressure profile 105 shows that the pressure is highest in the regions where the shaft 101 rotates closest to the bearing housing 102. Thus, the fluid film bearing will stabilize itself under varying radial loads—increasing loads result in a decreasing gap between the rotating shaft 101 and the bearing housing 102, resulting in a self-correcting increase in fluid film pressure which increases the ability of the fluid film bearing to sustain the applied load. The use of a viscous liquid such as oil to generate the fluid film also provides inherent damping to the fluid filled bearing.

Figure 2A:
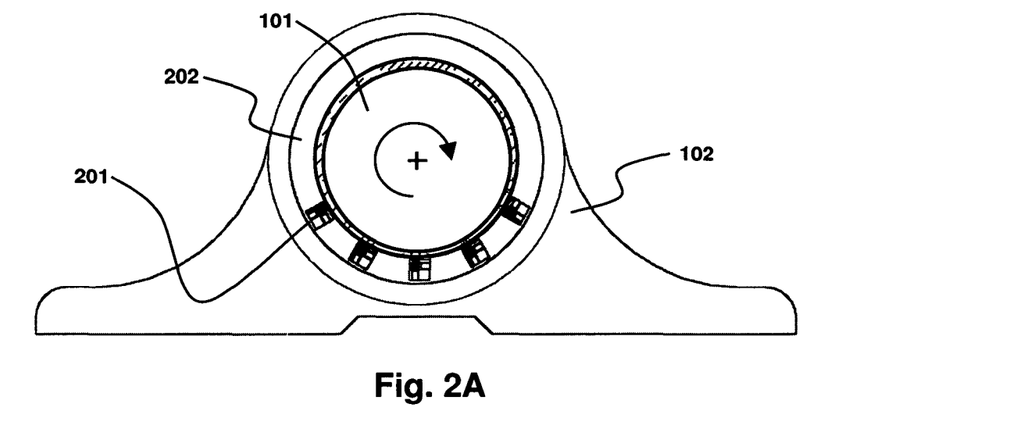
FIG. 2A and FIG. 2B show the fluid film bearing of FIG. 1 located inside a babbitt that further comprises radially oriented strain gages.
Figure 2B:
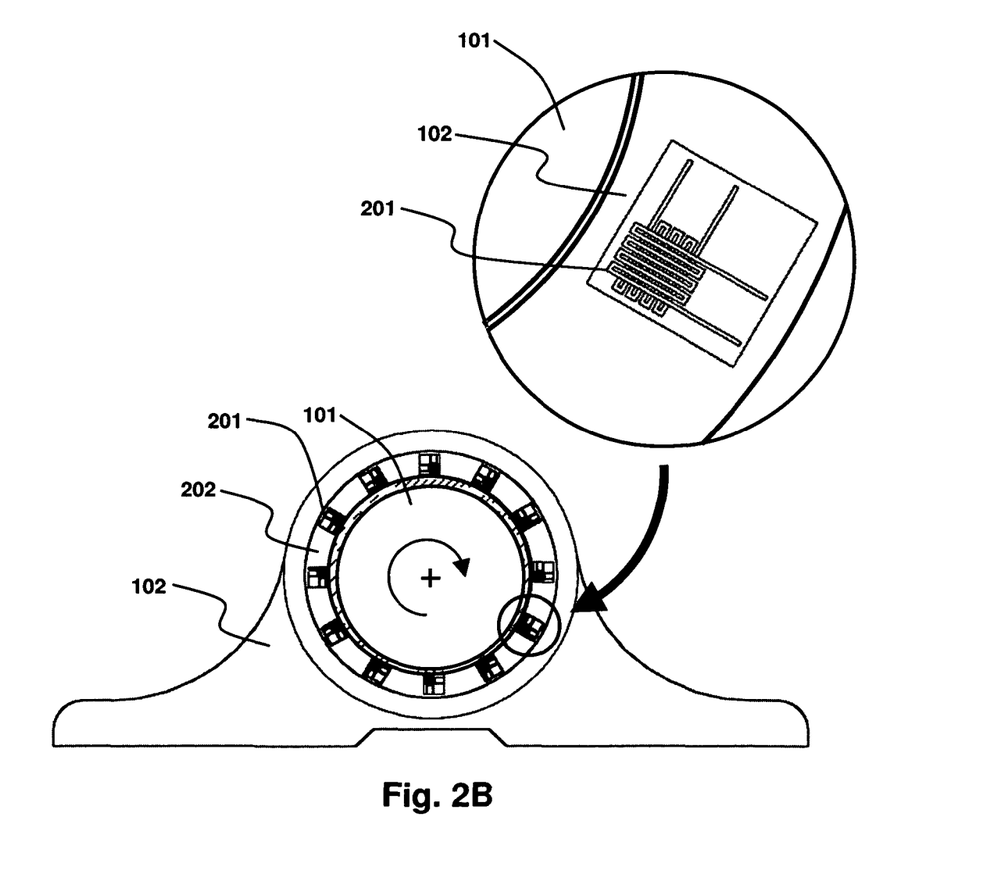

FIG. 2A and FIG. 2B show the fluid film bearing of FIG. 1, comprising the rotating shaft 101 and bearing housing 102, and further comprising one or more strain gages, shown at 201. The strain gage or gages 201 are located on a non-rotating part of the fluid film bearing proximate to the fluid film. In the embodiments shown in FIG. 2A and FIG. 2B, the strain gage or gages 201 are placed in a radial configuration on the end face of the babbitt 202. The babbitt 202 is a stationary material, typically a softer metal part of the bearing housing 102. The babbitt 202 is typically located closest to the fluid film. The strain gage or gages 201 could also be mounted in and/or on another part of the bearing housing 102. A bearing housing 102 can also be known as a pillow block or an engine block. The strain gage or gages 201 could be placed in any other location proximate to the fluid film, capable of being understood by anyone skilled in the art. FIG. 2A shows an embodiment of the present invention in which there are a plurality of strain gages 201 located on the face of the babbitt 202 in an arc near the bottom of the fluid film wherein the arc spans no more than 180 degrees and no less than 90 degrees. FIG. 2B shows an embodiment of the present invention in which there are a plurality of strain gages 201 placed at a regular spacing all the way around the face of the babbitt 202. There can be advantages to placing the strain gages on the softest, most flexible material, which is the babbitt material. Because the strain gauge is measuring a physical change in length, the most flexible material will result in the greatest change according to Hooke's Law. The strain gage or gages 201 in the embodiment shown in FIG. 2A and FIG. 2B are placed in a configuration on the babbitt material 202 so that they can measure radial strain.

Referring in more detail to the strain gage or gages 201 shown in FIG. 2A and FIG. 2B, the strain gage or gages 201 can be of several different transducer forms. All strain transducers are designed to convert a change in length of the measured surface into an electrical signal. This can be through a change in resistance, capacitance, inductance or piezoelectric effect of the transducer that is proportional to the observed strain. The most common strain transducer, depicted in FIG. 2A and FIG. 2B, is a metallic foil type strain gage 201 which consists of a fine grid of metallic wire (a resistor) which is bonded directly to the strained surface through adhesion, welding, or is cast into place. Strain gage foil material is selected to match temperature response between target material and the foil to minimize thermal strain. Common metallic foil materials and their respective gage factors include but are not limited to:

| Material | Gage Factor |
| --- | --- |
| Platinum (Pt 100%) | 6.1 |
| Platinum-Indium (Pt 95%, Ir 5%) | 5.1 |
| Platinum-Tungsten (Pt 92%, W 8%) | 4.0 |
| Isoelastic (Fe 55.5%, Ni 36% Cr 8%, Mn 0.5%) | 3.6 |
| Constantan/Advance/Copel (Ni 45%, Cu 55%) | 2.1 |
| Nichrome V (Ni 80%, Cr 20%) | 2.1 |
| Karma (Ni 74%, Cr 20%, Al 3%, Fe 3%) | 2.0 |
| Armour D (Fe 70%, Cr 20%, Al 10%) | 2.0 |
| Monel (Ni 67%, Cu 33%) | 1.9 |
| Manganin (Cu 84%, Mn 12%, Ni 4%) | 0.47 |
| Nickel (Ni 100%) | −12.1 |

When a load is applied to the surface of the strain gage, there is a resulting change in surface length. This change in length is measured through the resulting change in electrical resistance of the foil wire, which varies linearly with strain. Strain sensitivity, commonly known as gage factor (GF), is an experimentally determined dimensionless number for each strain transducer type according to the following equation:

$$GF = \frac{\frac{\Delta R}{R}}{\varepsilon}$$

In the equation above, R represents the initial resistance of the sensing element, $\Delta R$ represents the change in resistance of the sensing element, and $\varepsilon$ represents the measured strain value. This gage factor corresponds to the linear relationship between strain and resistance, and it is used to convert the measured resistance change into units of strain. Major manufacturers of metallic foil strain gages include but are not limited to OMEGA Engineering Inc., Vishay Precision Group, Inc., HBM Test and Measurement, and Kyowa Electronic Instruments. Metallic foil strain gages have the ability to measure both static strain and dynamic strain depending on the signal conditioning and measurement system being used.

Figure 3A:
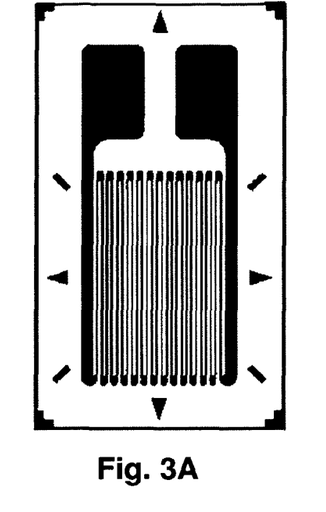
FIG. 3A shows a uniaxial strain gage.
Figure 3B:
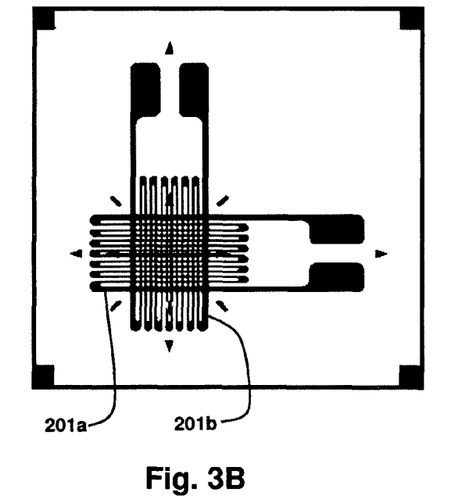
FIG. 3B shows a 90-degree biaxial tee rosette strain gage.
Figure 3C:
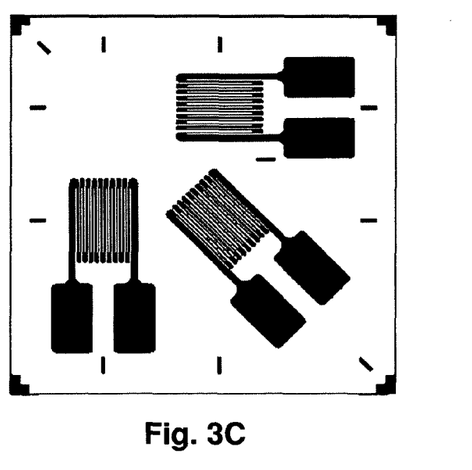
FIG. 3C shows a rectangular rosette strain gage.
Figure 3D:
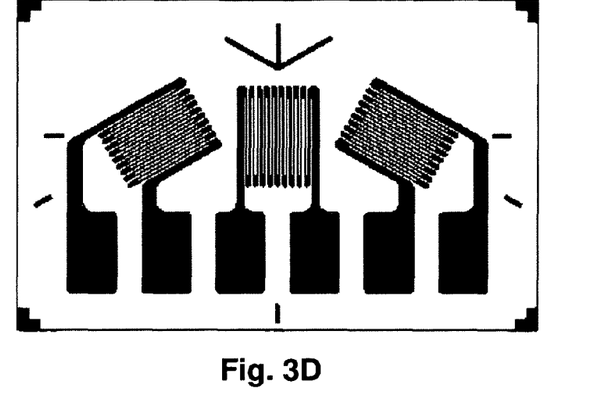
FIG. 3D shows a delta rosette strain gage.

Numerous different configurations of metallic foil strain gages exist that can be utilized in embodiments of the present invention. Referring to FIG. 3A a uniaxial strain gage are comprised of a single foil grid that measures strain in one principal direction. Referring to FIG. 3B a 90-degree biaxial tee rosette strain gage is comprised of two separate foil grids, a first foil grid shown at 201a and a second foil grid shown at 201b. The two foil grids 201a and 201 b are oriented 90 degrees apart from each other in a 90-degree biaxial tee rosette strain gage. The two strain gauge types shown in FIG. 3A and FIG. 3B are only used when the principal strain directions are known in advance. Using biaxial metallic foil strain gages, such as the one shown in FIG. 3B, one sensing grid will be oriented 90 degrees from the principal measurement direction in a non-stressed axis. This second strain grid is used as a second leg of a half-bridge Wheatstone bridge circuit in order to apply temperature compensation to the measurement. When the temperature of the strain gage changes the resistance of the gage is effected due to differences in thermal growth between the gage and the measured surface. By using biaxial strain gage rosettes, the change in temperature affects both strain gages equally. Because the changes in resistance are identical, the ratio of their resistance does not change and the voltage output of the Wheatstone bridge does not change due to temperature fluctuations. FIG. 3C shows a rectangular rosette strain gage. A rectangular rosette strain gage configuration consists of three different foil grids spaced 45 degrees apart. FIG. 3D shows a delta rosette strain gage. A delta rosette strain gage configuration consists of three different foil grids spaced 60 degrees apart. The advantage of rectangular rosette and delta rosette strain gage configurations is that the principal strain direction can be derived directly from the strain measurements.

Piezoelectric strain sensors are another transducer technology that can be used to measure dynamic strain for the purposes of fluid film bearing monitoring and failure detection. Piezoelectric strain sensors utilize a thin piezoelectric film that is bonded to the strained surface much in the same way as metallic foil strain gages. Quartz crystal is typically used as the piezoelectric element for the sensors. The crystal has a piezoelectric effect that produces a voltage proportional to compressive or tensile mechanical strain observed. Piezoelectric strain sensors are able to achieve higher sensitivity values than metallic-foil strain sensors, which make them ideal for accurate dynamic strain measurements. A common sensitivity found in piezoelectric strain gages is 50 mV/Re, with a measurement range of ±100µε. Due to the high stiffness and low mass of piezoelectric strain sensors, these sensors achieve a very high resonant frequency that allows a measurement frequency range of 0.5 Hz to 100 kHz.

Figure 4:
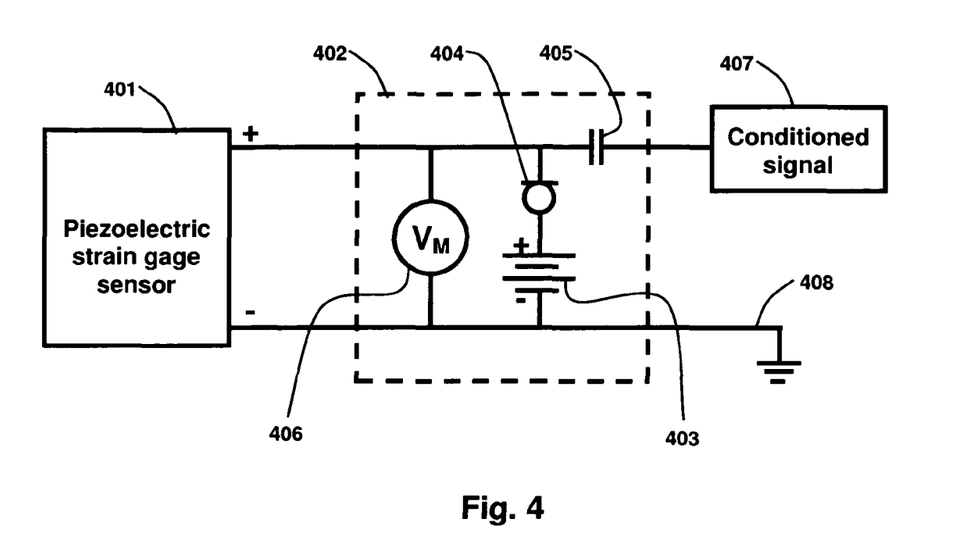
FIG. 4 shows a schematic of a signal conditioning system.

FIG. 4 shows a typical signal conditioning system schematic. This particular circuit is for a PCB Piezotronics, piezoelectric strain gage model 740B02 and is a typical example of the industry standard IEPE (Integrated Electronic Piezoelectric) signal conditioning that is also used for many industrial accelerometers. Referring to FIG. 4, a piezoelectric sensor is shown at 401. The typical piezoelectric sensor 401 comprises a piezoelectric crystal, a resistor and an amplifier. The + and − outputs of the piezoelectric sensor are connected to a the signal conditioner, shown at 402. The signal conditioner 402 typically comprises a constant voltage source 403, a constant current diode 404, and an inline coupling capacitor 405 in the configuration shown in FIG. 4. Excitation power can be 18-30 volts with 2-20 mA of constant current. The signal conditioner 402 can further comprise a voltmeter, shown at 406. The resulting conditioned signal 407 can then be fed into the rest of the circuit either as a single input or as a two wire input including the ground connection 408.

Piezoresistive strain sensors are another transducer technology that can be used to measure dynamic strain for the purposes of fluid film bearing monitoring. Piezoresistive strain sensors utilize a crystalline structure that changes electrical resistance under applied strain. In a piezoresistive strain sensor, strain produces changes in interatomic spacing, which affect the electrical band gaps and therefore allows electrons to be raised into the conduction band, resulting in a change of the electrical resistivity of the material. Within a certain range of strain, this relationship is linear. Piezoresistive strain sensors differ from metallic foil strain gages, which predominantly see a change in resistance due to changes in cross sectional area of the foil grid from applied strain. Piezoresistive strain sensors typically utilize a semiconductor in which resistance is largely controlled by the piezoresistive effect. The most common semiconductors utilized are germanium and silicon. Germanium has a gage factor of up to 500 depending on crystalline structure and temperature, which is three times higher than silicon. The useable frequency range for piezoresistive strain sensors is similar to that of piezoelectric strain sensors, and depends largely on the natural frequency of the piezoresistive material. Since piezoresistive strain sensors directly measure resistance, the same signal processing circuit used with metallic foil strain gages, consisting of a Wheatstone bridge, can be used to amplify and measure small changes in the resistance sensed by the piezoresistive strain sensor.

Further referring to FIG. 2A and FIG. 2B, the system and method shown operate on the principle that the strain gauge or gages will measure a deflection (or deflections) in the babbitt material, or another part of the bearing housing, caused by the force of the fluid wedge. Typical strain gauge measurement systems output an overall voltage that is converted into strain and then stress. This stress value is all that is typically desired for most common industry applications. The strain data can also be dynamically sampled to facilitate processing of the data at a higher level. Deflections of the strain gages can be proportional to the pressure of the wedge. Dynamic sampling of the strains can be used to correlate the dynamic behavior of the pressure wedge and oil distribution. The location and number of strain gauges can be optimized based on the configuration and application for the fluid film bearing. To monitor the condition of the pressure wedge, strain gauges can be oriented radially around the bearing housing 102 or babbitt 202 with a principal measurement direction that goes through the geometric center of the bearing bore. Minimally two strain gages spaced radially 90 degrees apart are required, however numerous strain gages can be used to span the entire 360-degree circumference of the bearing. This strain gage orientation allows for indirect estimation of radial forces applied from the shaft through the fluid wedge to the babbitt, or other part of the bearing housing. The strain gages can be directly bonded to the outer exposed surface of the babbitt, or other part of the bearing housing, with a thin layer of epoxy resin or cast directly into the babbitt material, or the material used for another part of the bearing housing.

Figure 5:
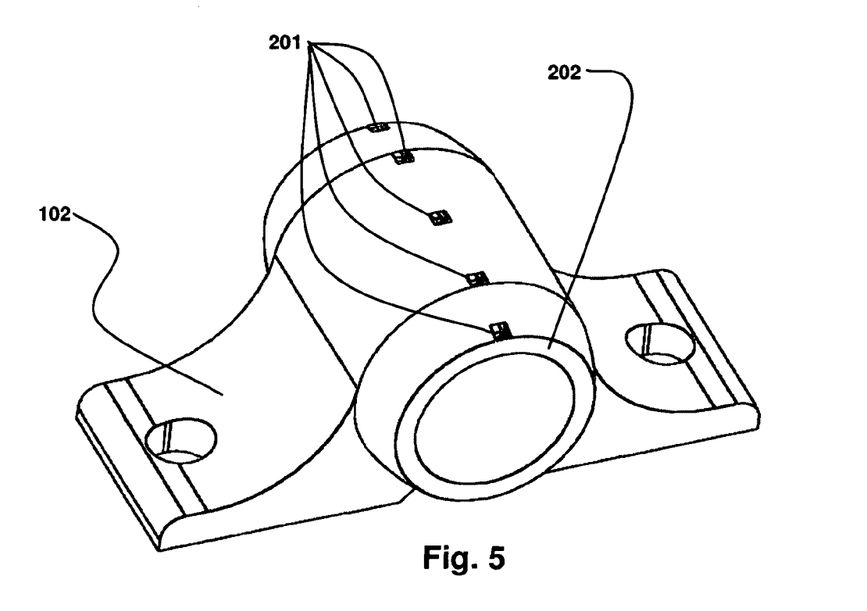
FIG. 5 shows the axial placement of strain gages in the babbitt material of a fluid film bearing.

FIG. 5 illustrates that strain gages (shown at 201) can also be distributed axially in the babbitt material 202, or some other part of the bearing housing 102 of a fluid film bearing. One benefit of axial placement of strain gages is that the axial distribution and uniformity of the oil pressure (or other fluid) can be measured. Referring in detail to FIG. 5, the strain gages 202 are oriented in such a way as to measure either axial strain (parallel to the shaft and bearing bore centerline), or strain tangential to the bearing bore centerline. A similar strain gage configuration can consist of strain gages 201 distributed axially directly beneath the babbitt 202, but with one measurement direction in the vertical direction and the other still oriented tangential. This configuration allows vertical strain to be measured at several different points axially along the length of the bearing. Large amplitudes of strain on one end of the bearing with corresponding low amplitudes on the opposite end are an indication of a vertical offset misalignment. These configurations can comprise strain gages 201 adhered directly to the surface of the bearing housing, embedded into the babbitt 202, mounted in narrow slots milled into the surface of the bearing housing 102, or mounted in some other part of the bearing housing 102. Referring to FIG. 2A, FIG. 2B, and FIG. 5, the strain gage or gages can be attached via adhesion, welding, or casting them into place, or any other technique capable of being understood by anyone skilled in the art.

Figure 6:
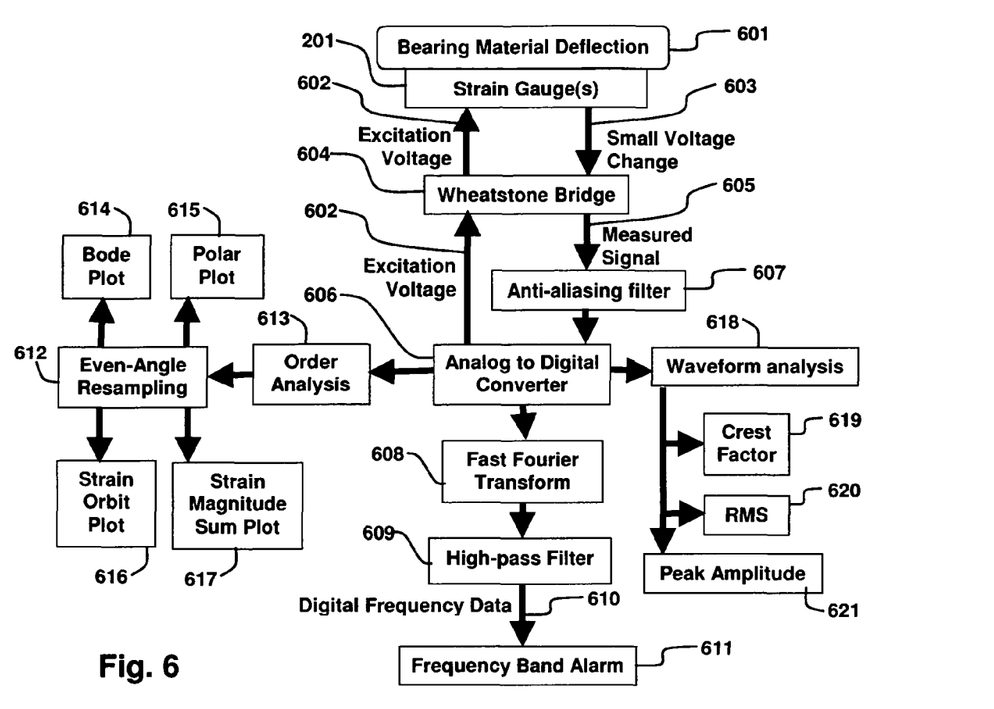
FIG. 6 shows a block diagram of one embodiment of a strain measurement based system and method for failure detection of a bearing.

FIG. 6 shows a block diagram of a system that converts bearing material deflection 601, as measured by one or more strain gages, into signals and graphs that can be analyzed to determine the health of a fluid film bearing. Referring to FIG. 6, the strain gauge (or gages) 201 is attached to some part of the bearing material, using a method that has been described previously in this disclosure. The strain gage (or gages) is responsive to bearing material deflection 601. The strain gage 201 (or gages) receives an excitation voltage, shown at 602, of 2.5 v, 5 v, or 10 v (constant voltage) and produces a small voltage change, shown at 603, that corresponds linearly to the measured bearing material deflection 601 per unit length (i.e. strain). Exact excitation voltage can vary depending on the type of strain gage used, but practically has been limited to 0.1 mV to 24 V. The excitation voltage 602 and small voltage change 603 are connected to a Wheatstone bridge circuit 604, shown in detail in FIG. 7, to generate a measured signal, shown at 605.

Figure 7:
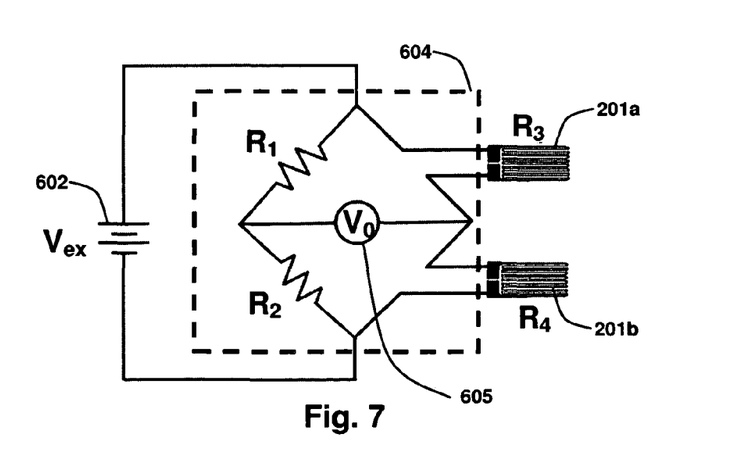
FIG. 7 shows a Wheatstone bridge circuit.

Further referring to FIG. 7, typical values for resistors $R_1$ and $R_2$ are 100 kΩ. This represents the half-bridge circuit configuration that is used with biaxial strain gages to apply thermal compensation to the measurement. A first foil grid 201a in the bridge is oriented in the principal strain direction, and the second foil grid 201b (often called a dummy leg) is oriented in an unstrained direction. The specifics of this strain measurement configuration can more clearly be understood by looking at FIG. 3B, which also shows the two foil grids of a biaxial strain gage at 201a and 201b. Any change in resistance due to thermal effects is identical for each foil grid, 201a or 201b, of the biaxial strain gage. The ratio between resistances therefore does not change due to thermal effects, and the output voltage 605 to the analog to digital converter remains unaffected by temperature fluctuations.

Further referring to FIG. 6, the measured signal 605 from the Wheatstone bridge 604 is then processed by an analog to digital converter 606. The analog to digital converter 606 can be of any type capable of being understood by anyone skilled in the art. The analog to digital converter 606 can output 2-32 bits, or higher, of digital amplitude resolution. The analog to digital converter 606 can be of a type and configuration that samples any and/or all frequencies, with a desired range being at least 0.1 Hz. Common analog to digital converters can sample up to 100 kHz. A minimum of 2 bits of resolution are needed, but the maximum number of bits can be any value. Prior to being processed by the analog to digital converter 606, the measured signal 605 can be processed in analog form by an anti-aliasing analog low pass filter 607. The anti-aliasing filter 607 can have a cutoff frequency equal to a maximum of 50% of the sampling rate. The anti-aliasing filter 607 is applied to the analog signal before any data has been converted to digital data. The anti-aliasing filter 607 ensures that no erroneous frequencies are present in the sampled data. After the data has been digitized, a Fourier transform or Fast Fourier Transform (FFT) can be applied to the signal as shown at 608, to convert the signal from the time domain to the frequency domain. A high pass filter 609 with a cutoff frequency ranging from 0.1 Hz to 10 Hz should also be applied to the signal. The high pass filter operation 609 can be performed before or after the FFT 608, via either software or hardware filtering. The high pass filter 609 can also be applied to the analog signal before it is digitized in the analog to digital converter 606. The digital frequency data 610 can be presented spectrally, illustrating the frequency response. A frequency band alarm 601 (or alarms) can be applied to the digital frequency data 610. The digital frequency data 610 can be measured and trends of the overall amplitude of each frequency component can be studied. Strain data can be resampled with shaft angular displacement to convert it to an even-angle signal, a step shown at 612. This means each resampled data point is offset from the previous sample by an even-angle, not even time. Order analysis can be performed by narrowband filtering certain orders of running speed, and noting amplitude and phase of the sinusoidal signal, a step shown at 613. This data can be used in Bode plots 614 and polar plots 615 for fault diagnostics. Strain data from one sensor can be plotted against the data from strain sensors at other locations to create plots that are similar to orbit plots 616 normally created with proximity probes. Orbit plots 616 can show the AC (alternating current) component of the signals from 2 or more strain gauges against each other to idealize total directional bearing strain. The DC (direct current) component of the strain signal can be plotted in a manner similar to a shaft centerline plot for proximity probes. These two plots are novel techniques for gaining insight into the dynamics within fluid film bearings. Strain magnitude sum plots 617 can also be created. The digital output from the analog to digital converter can also be used for various kinds of waveform analysis 618, such as analyzing the crest factor 619, RMS (root mean squared) values 620, and peak amplitudes 621.

Figure 8A:
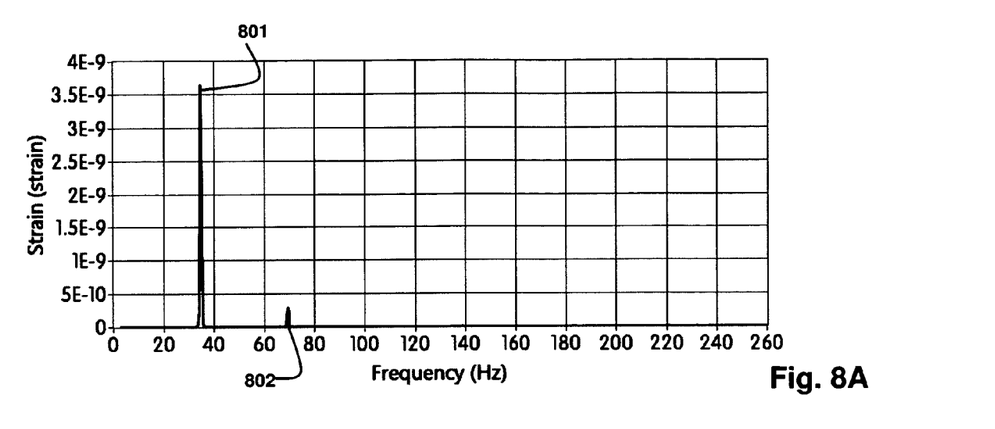
FIG. 8A shows the output signal in the frequency domain of a radial strain gage for a fluid film bearing that is in good condition.

FIG. 8A shows one output from the system described in FIG. 6 and FIG. 7, for a fluid film bearing that is operating normally. In this case, the time varying measured signal from the Wheatstone bridge has been digitized and then converted into the frequency domain using a fast Fourier transform and plotted to show amplitude as a function of frequency to produce digital frequency data (610 in FIG. 6). The plot of digital frequency data shows a large peak at about 34 Hertz (Hz) at 801 and a smaller peak at 2× this frequency (about 68 Hz) at 802, with no other significant oscillations in strain in the bearing. The 34 Hz peak 801 represents the rotational rate of the shaft in the fluid film bearing.

Figure 8B:
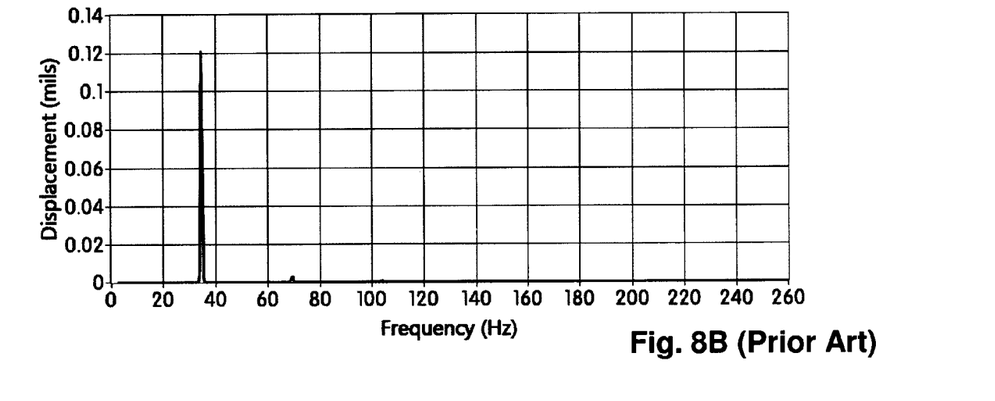
FIG. 8B shows the output signal in the frequency domain of a prior art proximity probe for a fluid film bearing that is in good condition.

FIG. 8B shows a similar output in the frequency domain for the same fluid film bearing as the bearing whose data was shown in FIG. 8A. The difference is that the signal to generate plot for FIG. 8B came from a proximity probe and the signal to generate the plot for FIG. 8A came from a strain gage. It is known in the prior art to use proximity probes for measuring the health of a fluid film bearing. It is much simpler and less expensive to use a strain gage than to use a proximity probe. Instrumenting a bearing with strain gages does not require machining threaded holes into the bearing housing as is required with proximity probes. A comparison of FIG. 8A and FIG. 8B shows that strain gages, can provide data that correlates highly with the data that comes from a proximity probe for a fluid film bearing that is operating normally.

Figure 8C:
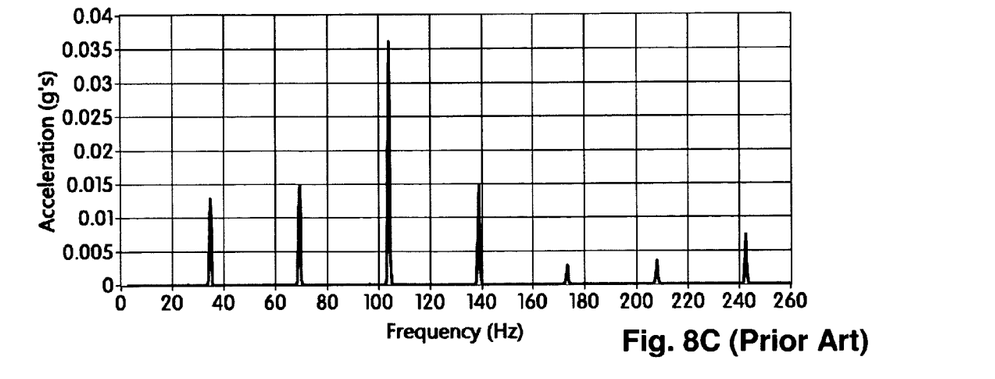
FIG. 8C shows the output signal in the frequency domain of a prior art accelerometer for a fluid film bearing that is in good condition.

FIG. 8C shows a similar output in the frequency domain for the same bearing as the bearing whose data was shown in FIG. 8A. The difference is that the signal to generate plot for FIG. 8C came from an accelerometer and the signal to generate the plot for FIG. 8A came from a strain gage. It is known in the prior art to use accelerometers for measuring the health of a fluid film bearing. However, accelerometers produce a signal that has much more high frequency noise in it. This high frequency noise coming from a healthy fluid film bearing can be difficult to distinguish from high-frequency data that shows that a fluid film bearing is failing.

Figure 9A:
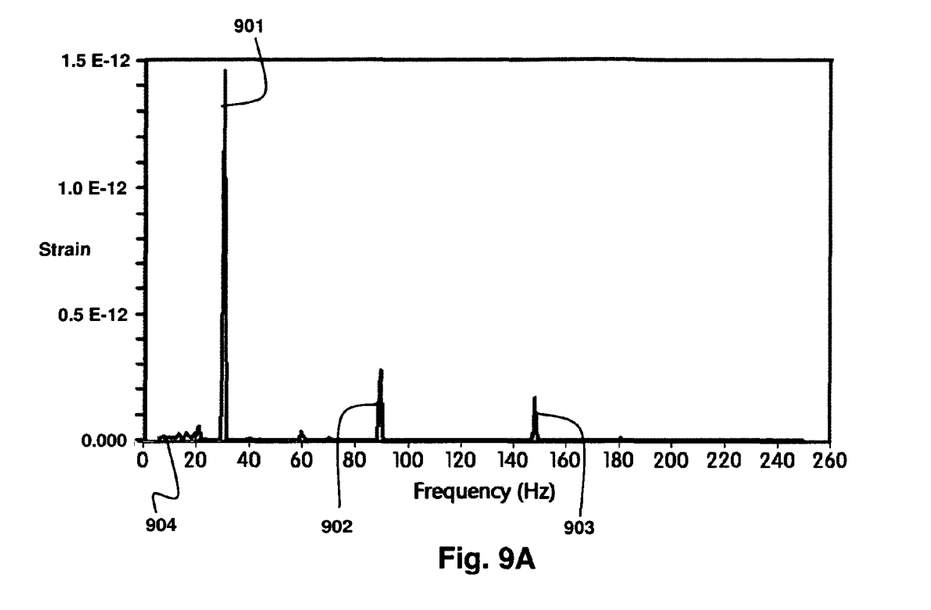
FIG. 9A shows the output signal in the frequency domain of a radial strain gage for a fluid film bearing that is unstable.

FIG. 9A shows one output from the system described in FIG. 6 and FIG. 7, for a fluid film bearing that has is unstable and has therefore failed. When comparing the output shown in FIG. 9A with the output shown in FIG. 8A, one can see that FIG. 9A shows additional peaks at frequencies not found in FIG. 9A. In this case, these additional peaks occur at frequencies of approximately 88 Hz, shown at 902, and 158 Hz, shown at 903. The peaks at 88 Hz 902 and 158 Hz 903 are not harmonics of the main 30 Hz frequency, shown at 901, in this plot and are not harmonics of each other. The main 30 Hz frequency 901 represents the rotational speed of the shaft. Notice that there are also low frequency strains in the range of 20 Hz and below, shown at 904. These low frequency strains 904 indicate failure and this particular failure mode is known as whirling.

Figure 9B:
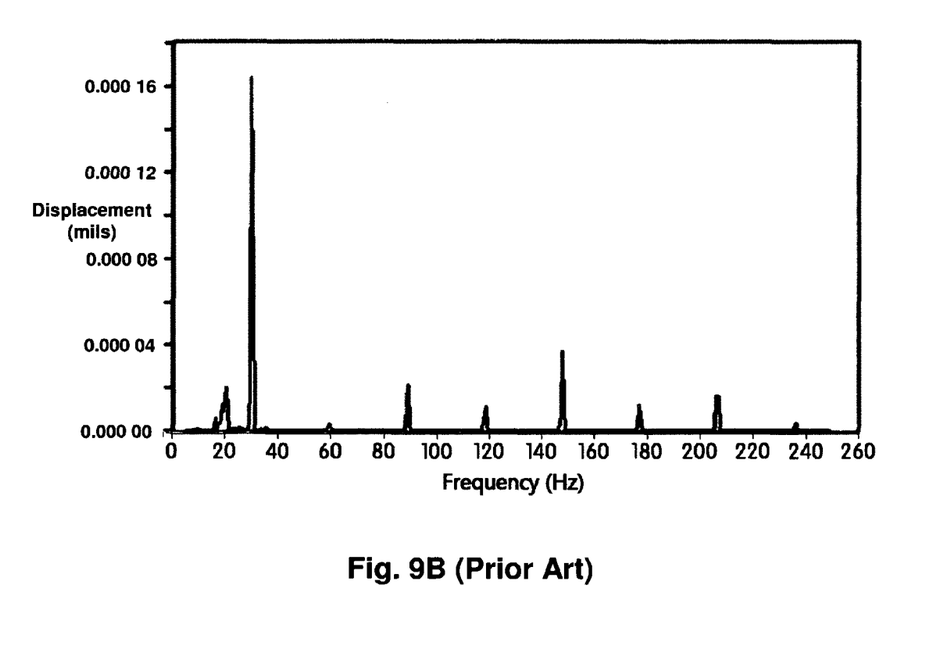
FIG. 9B shows the output signal in the frequency domain of a prior art proximity probe for a fluid film bearing that is unstable.

FIG. 9B shows a similar output in the frequency domain for the same fluid film bearing as the bearing whose data was shown in FIG. 9A. The difference is that the signal to generate plot for FIG. 9B came from a proximity probe and the signal to generate the plot for FIG. 9A came from a strain gage. A comparison of FIG. 9A and FIG. 9B shows that strain gages can provide data that correlates highly with the data that comes from a proximity probe for an unstable fluid film bearing. Both plots show the additional non-harmonic high frequency signals as well as the low frequency whirling.

Figure 10:
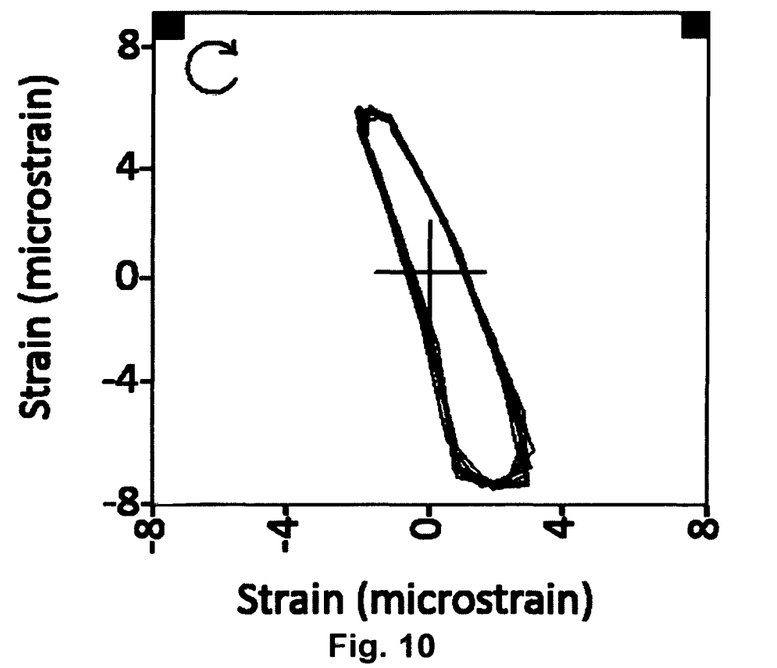
FIG. 10 shows the x-y strain gage output signal for 3 rotations of a system that uses a pair of radially oriented strain gages spaced 90 degrees apart in a babbitt of a bearing housing.

FIG. 10 shows a plot of the strain measured by two strain gages that are 90 degrees apart for three rotations of a shaft as plotted on an X-Y graph. Testing has shown that there is a high degree of correlation between the data obtained using strain gages and that using proximity probes.

In further embodiments, a strain gage based transducer and measurement system can be used to monitor the health of low speed rolling element bearings. Prior art condition monitoring sensors such as accelerometers, proximity probes, and RTDs (resistance temperature detectors) are not well suited for these applications. Common examples of low speed bearing applications include trunnion and kiln bearings or rollers. In some industrial applications trunnion bearings can comprise rotating cylinders with pathrings that are up to 7 meters in diameter that rotate slowly—a typical rotational speed might be 0.5 revolutions/minute (30 revolutions per hour). Similar devices called rotary kilns are used in cement manufacturing.

In another embodiment of this strain measurement system and method, wireless strain gages can be installed directly onto low speed rotating shafts that are supported by either rolling element or fluid film bearings. In this embodiment, the strain on the shaft surface is measured instead of the strain in the supporting bearings and/or bearing housings. In this embodiment the strain gage readings can be sent wirelessly from the rotating shaft to a stationary receiver for data analysis, signal processing, and fault detection. The strain information can also be transmitted over a wired connection through slip rings. The strain information can be transmitted as an analog signal or a digital signal.

In addition to condition monitoring and failure detection of fluid film bearings, another field of use for embodiments of the strain measurement system and method is the use of dynamically sampled strain gage measurements to perform dynamic balancing of rotor assemblies supported by fluid film bearings.

Embodiments of the he stain measurement method and system can be permanently installed on a piece of equipment and wired into the main control system of a plant. The strain measurement system and/or method can output an overall value corresponding to the sum of all strains present at each point in the system. The strain gages can be sampled dynamically and then converted to the frequency domain to identify faults. More specifically:

1. The strain gage voltages can be sampled at 100 kHz with a 24-bit analog-digital converter;
2. The time domain signals can be analyzed to quantify RMS (root mean square), peak, and other typical quantities of vibration;
3. A Fast Fourier Transform (FFT) of the time domain signals can be performed, with as many lines of resolution as necessary, to resolve vibration frequencies;
4. Frequencies from the FFT can be identified and used to establish alarm limits of vibration; and
5. The amplitudes of frequencies of interest can be trended and correlated to fluid film bearing wear and overall health of the fluid film bearing.

There can be multiple methods for manufacturing embodiments of the present invention. In one method, the strain gage sensor or sensors sit on the outer circumference of the babbitt. This could have the form and manufacturing methods used to produce custom load cells. In an alternate manufacturing method, an array of strain gauges is placed on the bearing surface prior to the Babbitt material being cast. This alternate manufacturing method would allow the strain gauges to be embedded during the casting process. A third manufacturing method would be to install strain gauges on the bearing housing assembly.

The system and method described in the present application can be implemented as a device or as a service. If implemented as a service, a provider can install the strain gage or gages, receive the signals from the strain gage or gages, and or process the signals. The results of the processed signals can be provided to the client as data or as alarms.

Embodiments of the strain measurement system and method described here can be used on varies types of industrial and non-industrial equipment. Examples include, but are not limited to, AC induction motors, DC motors, steam turbines, centrifugal compressors, centrifugal fans, centrifugal blowers, centrifugal pumps, gearboxes, conveyors, reciprocating compressors, and reciprocating engines. The types of bearings to which embodiments of the strain measurement system and method can be applied to can include radial bearings, thrust bearings, crank bearings, rod bearings, foil bearings, and air bearings. These bearing applications can be used in a hydrodynamic or a hydrostatic configuration. Common bearing designs include; plain sleeve bearings, pressure fed sleeve bearings, oil ring lubricated, multi-lobe bearings, lemon-bore bearings, offset half bearings, pressure dam bearings, and tilt pad bearings. The lubricating fluid utilized in fluid film bearings include but are not limited to; oil, grease, air, gas, water, and various process fluids such as drilling mud used when drilling for oil or gas.

A further number of variations and modifications of the disclosed embodiments can also be used. While the principles of the disclosure have been described above in connection with specific apparatuses and methods, it is to be clearly understood that this description is made only by way of example and not as limitation on the scope of the disclosure.

We claim:

1. A system for detecting a failure of a fluid film bearing wherein the fluid film bearing comprises a rotating cylindrical shaft supported by a hydrodynamic fluid film separating the rotating cylindrical shaft from the smooth cylindrical inner surface of a non-rotating bearing housing, the system comprising:
a strain transducer attached to the bearing housing in a region proximate to the fluid film wherein:
the strain transducer receives an electrical excitation;
the strain transducer generates an electrically measurable output in response to changes in strain of the bearing housing caused by changes in pressure of the fluid film;
the strain transducer comprises a device selected from the group of a metallic foil strain gage, a piezoelectric strain sensor, and a piezoresistive strain sensor; and
the measurement of strain does not comprise the use of a laser;
a Wheatstone bridge circuit that produces a time varying analog electrical signal in response to the electrically measurable output of the strain transducer;
an analog to digital converter that generates a time varying digital electrical signal in response to the time varying analog electrical signal;
a digital Fourier transform algorithm that converts the time varying digital signal into a frequency domain digital signal.

2. The system of claim 1 wherein:
the fluid film comprises a viscous liquid;
the strain transducer is attached to the end face of a babbitt that is part of the bearing housing;
the response of the strain transducer to changes in strain of the bearing housing is a linear change of resistance;
the strain transducer comprises:
a metallic foil strain gage further comprising a material selected from the group of platinum, nickel, and chromium;
a first strain element that is placed in an orientation that measures strain of the end face of the babbitt in a radial direction; and
a second strain element that is placed in an orientation that measures strain in a direction perpendicular to the first strain element;
the electrical excitation comprises a constant voltage no greater than 24 volts; and
the system further comprises an anti-aliasing low pass filter responsive to the time varying analog electrical signal wherein the anti-aliasing low pass filter has a cutoff frequency no greater than 50% of the sampling rate of the analog to digital converter.

3. The system of claim 2 wherein:
the viscous liquid comprises drilling mud;
the system further comprises a plurality of strain gages equally spaced all around the end face of the babbitt;
the system further comprises a plurality of strain gages distributed axially in the babbitt material and oriented to measure a strain selected from the group of strain parallel to the bearing bore center line and strain tangential to the bearing bore centerline;
the metallic foil strain gages have a gage factor of less than −12;
the metallic foil strain gages comprise 90-degree biaxial tee rosette strain gages;
the system further comprises an alarm-generating element responsive to the output of the digital Fourier transform;
the system further comprises a high pass filter with a cutoff frequency of at least 0.1 Hertz;
the system further generates orbit plots;
the system further comprises strain transducers attached to the rotating shaft that measure shaft surface strain and wirelessly transmit the shaft surface strain information to a stationary receiver.

4. A system for detecting a failure of a hydrodynamic bearing, the system comprising:
a strain transducer attached to a fixed non-rotating part of the bearing proximate to a fluid film in the gap between a rotating shaft and the non-rotating part of the bearing wherein:
the transducer is responsive to fluid film pressure changes; and
the transducer does not comprise a laser;
an electrical excitation provided to the transducer;
a Wheatstone bridge circuit responsive to a change in a property of the transducer caused by fluid film pressure changes;
an analog to digital converter responsive to the Wheatstone bridge circuit; and
a digital Fourier transform algorithm that converts the time-varying digital output of the analog to digital converter to a frequency spectrum.

5. The system of claim 4 wherein:
the fluid film comprises a liquid selected from the group of oil, grease, water, or drilling mud;
the strain transducer is attached to the end face of a babbitt that is part of the bearing housing;
a second strain transducer is attached to the end face of the babbitt at a location that is 90 degrees offset from the first transducer about the central axis of the bearing; and
the system generates an orbit plot in response to fluid film pressure changes measured by the first transducer and the second transducer.

6. The system of claim 4 wherein:
the strain transducer comprises a piezoelectric strain sensor comprising a quartz crystal
the system further comprises a signal conditioner wherein the signal conditioner comprises a coupling capacitor, a voltage source, and a constant current diode.

7. The system of claim 4 wherein:
the strain transducer comprises a piezoresistive strain sensor comprising a material selected from the group of silicon and germanium.

8. The system of claim 4 wherein:
the system is used to measure whirl of a fluid film bearing.

9. The system of claim 4 wherein:

the system further comprises an alarm generating element responsive to the frequency spectrum; and the system operates as a monitoring service that provides feedback to the party responsible for the equipment on which it is installed when the alarm generating element detects a potential failure.

10. The system of claim 4 wherein:

the fluid film comprises a gas.

11. The system of claim 4 wherein:

the system further comprises a plurality of strain transducers distributed axially in the bearing housing.

12. The system of claim 4 wherein:

the system further comprises an even-angle resampling module that reorganizes the digital output data from the analog to digital converter into a format that shows the behavior of the bearing as a function of the angle of rotation of the shaft.

13. The system of claim 4 wherein:

the system further comprises a waveform analyzer that uses the time varying digital output of the analog to digital converter to calculate a value selected from the group of a peak amplitude, a crest factor, and a root mean squared factor.

14. The system of claim 4 wherein:

the strain transducer comprises a delta rosette strain gage.

15. The system of claim 4 wherein:

the strain transducer comprises a rectangular rosette strain gage.

16. The system of claim 4 wherein:

the bearing housing further comprises a babbitt;

the strain transducer is bonded to the babbitt with an adhesive.

17. The system of claim 4 wherein:

the strain transducer comprises two strain measuring elements oriented at a 90 degree angle to each other and one of the strain measuring elements measures radial strain.

18. The system of claim 4 wherein:

the fluid film comprises a process fluid and the process fluid comprises mud.

19. A method for measuring the health of a journal bearing, the method comprising the steps of:

mounting a strain transducer on the journal bearing;

using a strain transducer and a wheatstone bridge circuit to measure time-varying changes in a pressure of a fluid film in the journal bearing wherein the pressure measurement:

does not comprise a laser; and does comprise a device selected from the group of a metallic foil strain gage, a piezoelectric strain sensor, and a piezoresistive strain sensor;

digitizing the time varying pressure measurement to produce a time varying digital signal; and generating a frequency spectrum of the digital signal.

20. The method of claim 19 wherein:

mounting further comprises fixedly attaching the strain transducer in the housing of the journal bearing;

using a strain transducer further comprises:

a first strain sensor that measures strain in a first direction in the housing;

a second strain sensor that measures strain in a second direction in the housing; and the Wheatstone bridge circuit connected to both the first strain sensor and the second strain sensor;

digitizing further comprises an anti-aliasing low pass filter wherein:

the time varying pressure measurement is filtered to remove frequencies greater than 50% of the sampling rate at which the time varying pressure measurement will be digitized.

* * * * *